US011100076B2

(12) United States Patent
Abreu et al.

(10) Patent No.: US 11,100,076 B2
(45) Date of Patent: Aug. 24, 2021

(54) PROCESSING SYSTEM FOR AUTOMATED ELECTRONIC RECORD CREATION AND TRANSMISSION

(71) Applicant: Hartford Fire Insurance Company, Hartford, CT (US)

(72) Inventors: Christopher Blair Abreu, Farmington, CT (US); Stephen J. Aloi, Southington, CT (US); Joseph L Murdzek, East Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 953 days.

(21) Appl. No.: 15/063,835

(22) Filed: Mar. 8, 2016

(65) Prior Publication Data

US 2017/0262483 A1 Sep. 14, 2017

(51) Int. Cl.
*G06F 16/22* (2019.01)
*H04L 29/08* (2006.01)
*G06F 16/23* (2019.01)

(52) U.S. Cl.
CPC ...... *G06F 16/2282* (2019.01); *G06F 16/2379* (2019.01); *H04L 67/10* (2013.01); *H04L 67/04* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 6,467,080 B1 | 10/2002 | Devine et al. | |
| 7,305,616 B1 | 12/2007 | Nelson et al. | |
| 7,788,640 B2 | 8/2010 | Grimaldi | |
| 8,261,182 B1 | 9/2012 | Petersen | |
| 8,312,368 B2 | 11/2012 | Swamidass | |
| 2001/0047279 A1* | 11/2001 | Gargone | G06Q 10/067 705/342 |
| 2002/0059348 A1 | 5/2002 | Lee et al. | |
| 2005/0060688 A1 | 3/2005 | Kamalakantha | |
| 2009/0183066 A1 | 7/2009 | Crawford et al. | |
| 2010/0005079 A1* | 1/2010 | Bayliss | G06F 16/24578 707/E17.014 |
| 2013/0097253 A1* | 4/2013 | Mencke | H04L 67/10 709/206 |

* cited by examiner

*Primary Examiner* — Amresh Singh
(74) *Attorney, Agent, or Firm* — Buckley, Maschoff & Talwalkar LLC

(57) ABSTRACT

Mediums, apparatus, computer program code, and means may be provided to customize electronic records associated with a distributed communication network via an automated back-end application computer server. According to some embodiments, a relational database management system database and a plurality of database tables linked to the relational database management system database may be accessed. The back-end application computer server may retrieve electronic record layout information and utilize pre-determined logic associated with the plurality of linked tables, including logic that matches multiple pointers within a single pair of linked tables, to automatically insert accessed data into a customized electronic record in accordance with the electronic record layout information. The customized electronic record may then be transmitted to be rendered via an interactive user interface display.

10 Claims, 15 Drawing Sheets

Data Dictionary Table

| Prod_Desc | ProductVerbose | ProductYield |
|---|---|---|
| ABS-AFS | Asset Backed Securities – Available For Sale | Risk Management will go through the following process to determine which yield curve ID to use:<br>• Lookup Product ID for the transaction in the portfolio table<br>• Determine the Yield Curve Class that is assigned to the Product ID<br>• Lookup the currency for the transaction in the portfolio<br>• Look for the Yield Curve ID that has the same combination of class and currency designation |
| | | |
| | | |

II. OPTIONALITY 1060

Text text text text text text text Text text text text text text text text text text text text text text text Text text text text text text text text text text text Text text text text text text text text text text text text Text text text text text text text text text text text

III. VALUATION 1070

Text text text text text text text Text text text text text text text text text text text text text text text Text text text text text text text text text text text Text text text text text text text text text text text text Text text text text text text text text text text text

IV. YIELD CURVE/SPREAD: 1080

Risk Management will go through the following process to determine which yield curve ID to use:
• Lookup Product ID for the transaction in the portfolio table
• Determine the Yield Curve Class that is assigned to the Product ID
• Lookup the currency for the transaction in the portfolio
• Look for the Yield Curve ID that has the same combination of class and currency designation The yield curve for this instrument is the USD-Govt yield curve. The yield curve name can be found on the RMYCID table. This can be confirmed by going though the above process using a Product ID of 10000, a yield curve class of Govt, and a currency of USD. The term structure model (forecast of interest rates) is Single Model Factor Y, which is a one-factor term structure model. It assumes that a single shock influences all changes in rates. This will cause a parallel shift with more weight given to the short end of the curve, which typically has more volatility than the long end. There is a large probability of getting a large shock which, when amplified, by the volatility, could result in negative rates. The yield curve is smoothed using a Linear Yield Curve smoothing technique. The convention in which the maturities are quoted in the YC_DATA table is "Maturity given by actual dates", this choice will affect how rates should be input in the YC_DATA table.

V. DAY COUNT DESCRIPTION 1090

Text text text text text text text Text text text text text text text text text text text text text text text Text text text text text text text text text text text Text text text text text text text text text text text text Text text text text text text text text text text text

PROCESSING SYSTEM FOR AUTOMATED ELECTRONIC RECORD CREATION AND TRANSMISSION

BACKGROUND

Electronic records may be used to transfer information between devices. Moreover, in some cases electronic records may need to be created relatively quickly. For example, substantial delays during a creation of an electronic record might make some of the information within the record incomplete or incorrect (e.g., when underlying factors associated with the record change during creation of the record). Also note that some electronic records may need to be created and/or customized in an extremely accurate manner and, in such situations, this may result in delays being introduced during the creation of the electronic record (e.g., so that information in the record can be verified). Further note that consistency between electronic records may be desired. For example, the layout, formatting, structure, terminology, etc. may need to be consistent between various electronic records (and/or between different versions of a single electronic record). In some cases, improving the creation of an electronic record may result in substantial improvements to the operation of a communication network and/or enterprise (e.g., by reducing record revisions that need to be created and transmitted via the network and/or ensuring that the record will serve an intended purpose).

It would be desirable to provide systems and methods to automatically create electronic records in a way that provides faster, more accurate results and that allows for flexibility and effectiveness when using the records.

SUMMARY OF THE INVENTION

According to some embodiments, systems, methods, apparatus, computer program code and means are provided to automatically create electronic records in a way that provides faster, more accurate results and that allows for flexibility and effectiveness when using the records. According to some embodiments, a relational database management system database and a plurality of database tables linked to the relational database management system database may be accessed. The back-end application computer server may retrieve electronic record layout information and utilize pre-determined mapping logic to automatically insert accessed data into a customized electronic record in accordance with the electronic record layout information. The customized electronic record may then be transmitted to be rendered via an interactive user interface display.

Some embodiments comprise: means for accessing a relational database management system database; means for accessing a plurality of database tables linked to the relational database management system database; means for retrieving, by the back-end application computer server, electronic record layout information; means for utilizing pre-determined mapping logic to automatically insert accessed data into a customized electronic record in accordance with the electronic record layout information; and means for transmitting the customized electronic record to be rendered via an interactive user interface display.

In some embodiments, a communication device associated with a back-end application computer server exchanges information with remote devices. The information may be exchanged, for example, via public and/or proprietary communication networks.

A technical effect of some embodiments of the invention is an improved and computerized way to automatically create electronic records in a way that provides faster, more accurate results and that allows for flexibility and effectiveness when using the records. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a data dictionary table in accordance with some embodiments.

FIG. 10B illustrates a customized risk management document that is composed of multiple sections in accordance with some embodiments.

DETAILED DESCRIPTION

The present invention provides significant technical improvements to facilitate electronic record creation and dynamic data processing. The present invention is directed to more than merely a computer implementation of a routine or conventional activity previously known in the industry as it significantly advances the technical efficiency, access and/or accuracy of electronic records by implementing a specific new method and system as defined herein. The present invention is a specific advancement in the area of automatically improving electronic record creation by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be transmitted to remote devices from a back-end application server and the information may comprise automatically created and/or compiled electronic records, thus improving the overall performance of the system (e.g., by reducing the number of records that need to be transmitted via a network for review).

Figure 1:
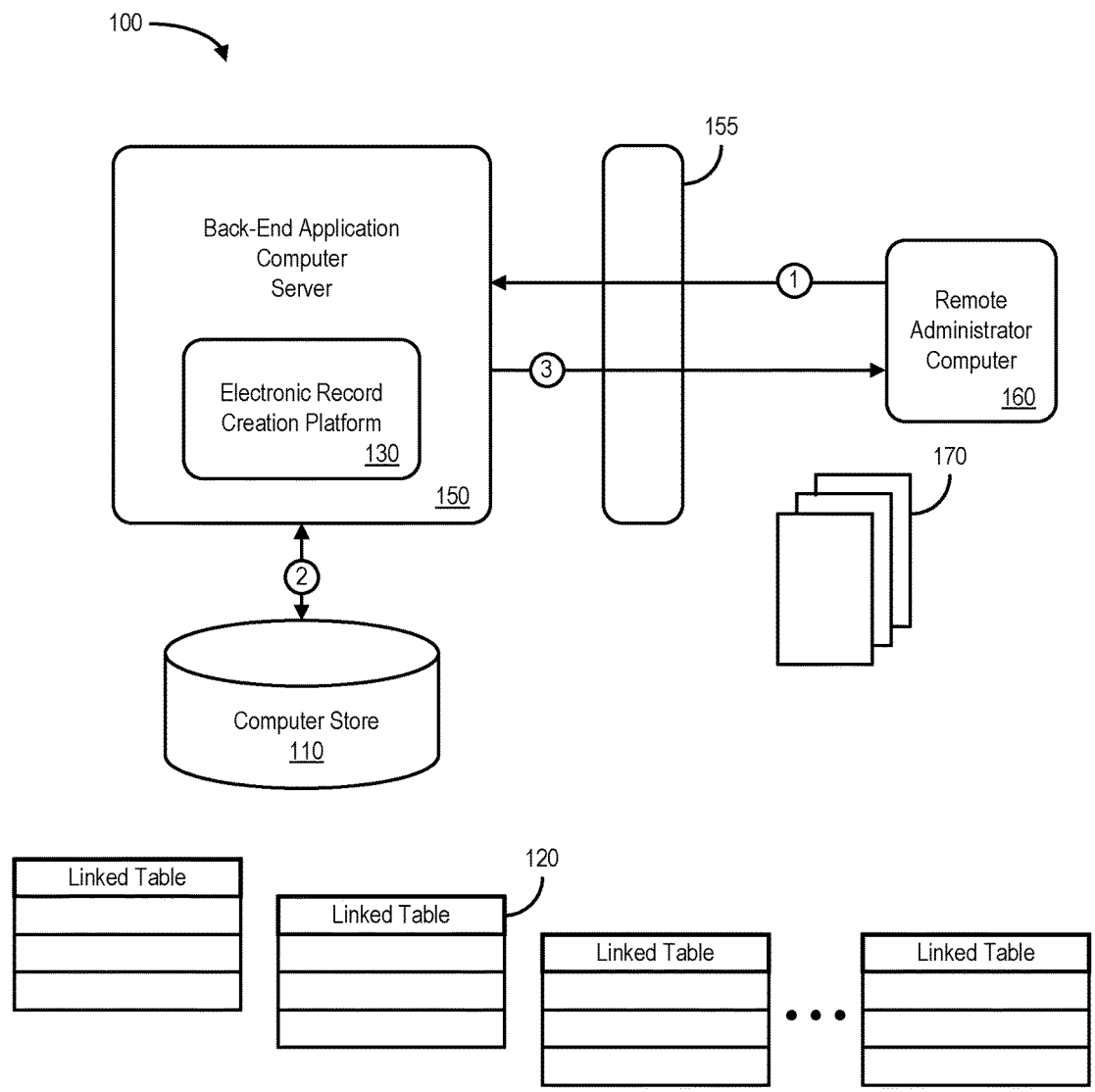
FIG. 1 is a high-level block diagram of a system according to some embodiments.

Electronic records may be used to transfer information between devices. Moreover, in some cases electronic records may need to be created relatively quickly and the electronic records may need to be created and/or customized in an extremely accurate manner. Still further, consistency between different types and/or versions of electronic records may be desired. It would therefore be helpful to provide systems and methods to automatically create and/or compile electronic records in a way that allows for faster, more accurate results as well as providing flexibility and effectiveness when using and/or accessing the records. FIG. 1 is a high-level block diagram of a system 100 according to some embodiments of the present invention. In particular, the system 100 includes a back-end application computer server 150 that may access information in a computer store 110 (e.g., storing one or more relational databases, data dictionaries, parameters, pre-determined mapping logic, etc.) and a plurality of linked tables 120 (e.g., containing data, such as alphanumeric values, images, etc.) that might be automatically incorporated into electronic records). The back-end application computer server 150 may also exchange information with a remote administrator computer 160 (e.g., via a firewall 155).

According to some embodiments, an electronic record creation platform 130 of the back-end application computer server 150 may facilitate a creation and/or compilation of electronic records and/or the transmission of such records via one or more remote administrator computers 160. The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may facilitate the creation and/or compilation of one or more electronic records based at least in part on information in the computer store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store data associated with electronic records. The computer store 110 may be locally stored or reside remote from the back-end application computer server 150. As will be described further below, the computer store 110 may be used by the back-end application computer server 150 to generate and/or transmit electronic records. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may automatically create electronic records via the automated back-end application computer server 150. For example, at (1) the remote administrator computer 160 may request that an electronic record be created and/or updated. The electronic record creation platform 130 may then access information in the computer store 110 and/or linked tables 120 at (2), and transmit an electronic file or series of files comprising the electronic record to the remote administrator computer at (3).

Figure 2:
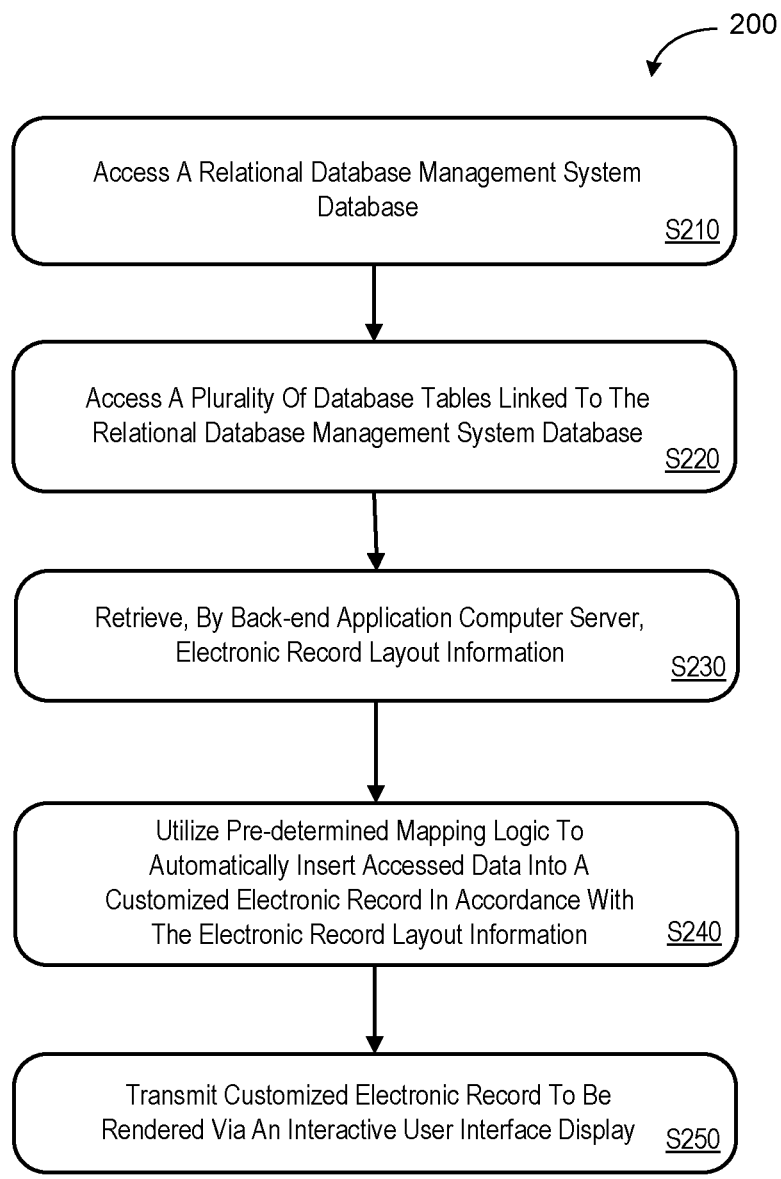
FIG. 2 illustrates a method according to some embodiments of the present invention.

Note that the system 100 of FIG. 1 is provided only as an example, and embodiments may be associated with additional elements or components. According to some embodiments, the elements of the system 100 automatically generate and transmit data associated with electronic records over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back end application server may access a Relational Database Management ("RDBM") system database. At S220, the back-end application server may access a plurality of database tables linked to the relational database management system database. At least one of the RDBM system database and the plurality of database tables might be associated with, for example, an electronic record layout template, Visual Basic for Applications ("VBA") code, Structured Query Language ("SQL") data, a data dictionary, and/or financial parameters.

At S230, the back-end application computer server may retrieve electronic record layout information. The electronic record layout information may be, for example, associated with an electronic record template (e.g., defining how a document should be formatted, constructed, etc.).

At S240, the system may utilize pre-determined logic associated with the plurality of linked tables, including logic that matches multiple pointers within a single pair of linked tables, to automatically insert accessed data (e.g., alphanumeric characters, images, etc.) into a customized electronic record in accordance with the electronic record layout information. According to some embodiments, this inserting is performed automatically upon a change in information stored in the RDBM system database and/or the plurality of database tables (e.g., such a change might automatically trigger a creation of a new electronic record). According to other embodiments, the inserting is performed upon initiation by an operator or administrator (e.g., when he or she executes a document creation tool), and/or on a periodic basis (e.g., on a daily basis, quarterly basis, etc.). According to some embodiments, the back-end application server is further to retrieve data to be inserted into the customized electronic record from a third-party source (e.g., a governmental source, a banking source, credit source), and the system may execute an automated data verification process ensure that the retrieved data is complete and up-to-date (e.g., the information has not become corrupted).

According to some embodiments, the customized electronic record represents a human-readable risk management document (e.g., a word processing document, pdf file, etc.) associated with an asset. For example, the asset might be associated with a portfolio of assets, insurance industry assets, banking industry assets, and/or an asset modeling or forecasting system. Note that such a document might be associated with Asset Backed Securities—Available For Sale ("ABS-AFS"), a hedge fund, private equity, real estate, bank loans, cash securities, collateralized loan obligations, mortgage-backed securities, non-dollar securities, residential mortgage-backed securities, commercial mortgage-backed securities, collateralized mortgage obligations, commercial mortgages held to maturity, and/or corporate bonds. Moreover, the human-readable risk management document might be further associated with a valuation, a yield curve/spread, a day count description, and/or a credit description.

At S250, the system may transmit the customized electronic record to be rendered via an interactive user interface display. Such a customized electronic record (e.g., a customized document) might be used to evidence compliance with securities regulations, accounting standards, etc.

Figure 3:
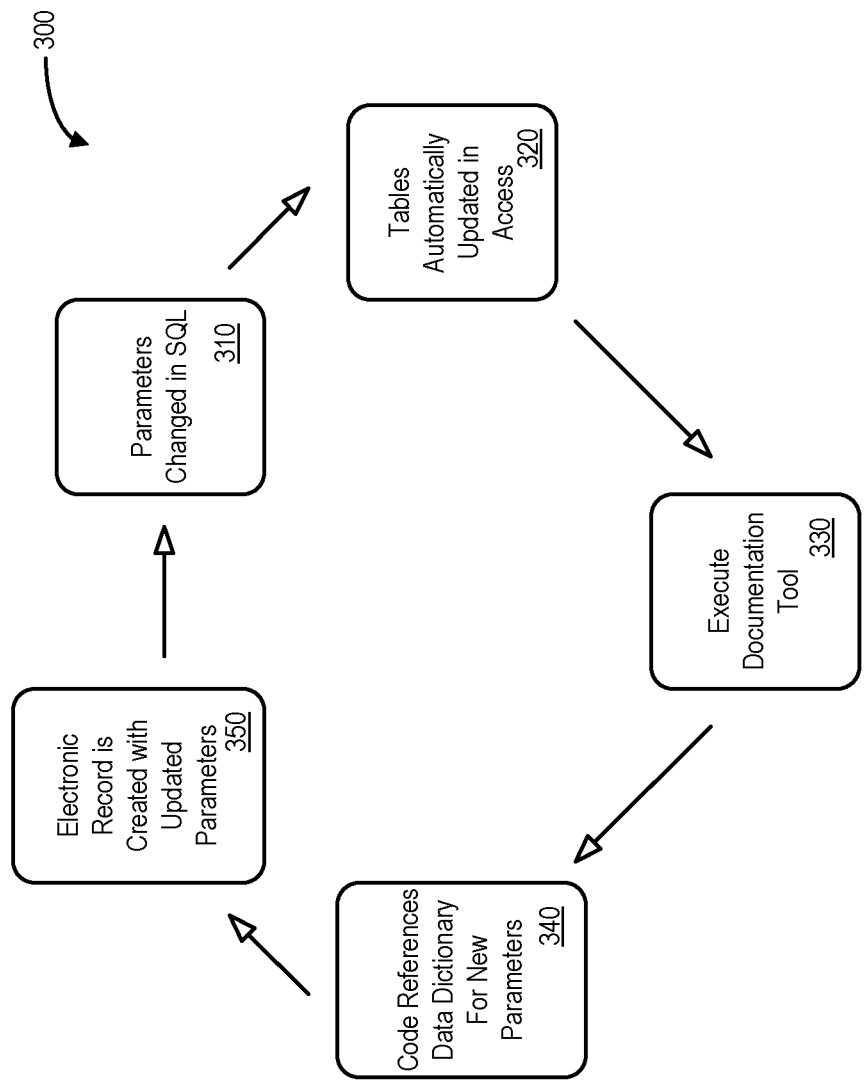
FIG. 3 is a data flow cycle in accordance with some embodiments.

FIG. 3 is a data flow cycle 300 in accordance with some embodiments. At 310, one or more parameters may be changed in connection with SQL protocol. For example, a "Currency" field might be changed from "Euros" to "US Dollars." At 320, one or more tables may be automatically updated in accordance with a Database Management System ("DBMS") such as the Access® DBMS available from the MICROSOFT® CORPORATION. At 330, a documentation tool may be executed (e.g., either automatically or in response to a selection by an operator or administration), and code may reference data dictionary for new parameters at 340. At 350, an electronic record is created with the updated parameters (e.g., a human readable word processing document might be automatically created with the updated parameters). Such an approach may, for example, improve the productivity and/or accuracy of an enterprise.

Figure 4:
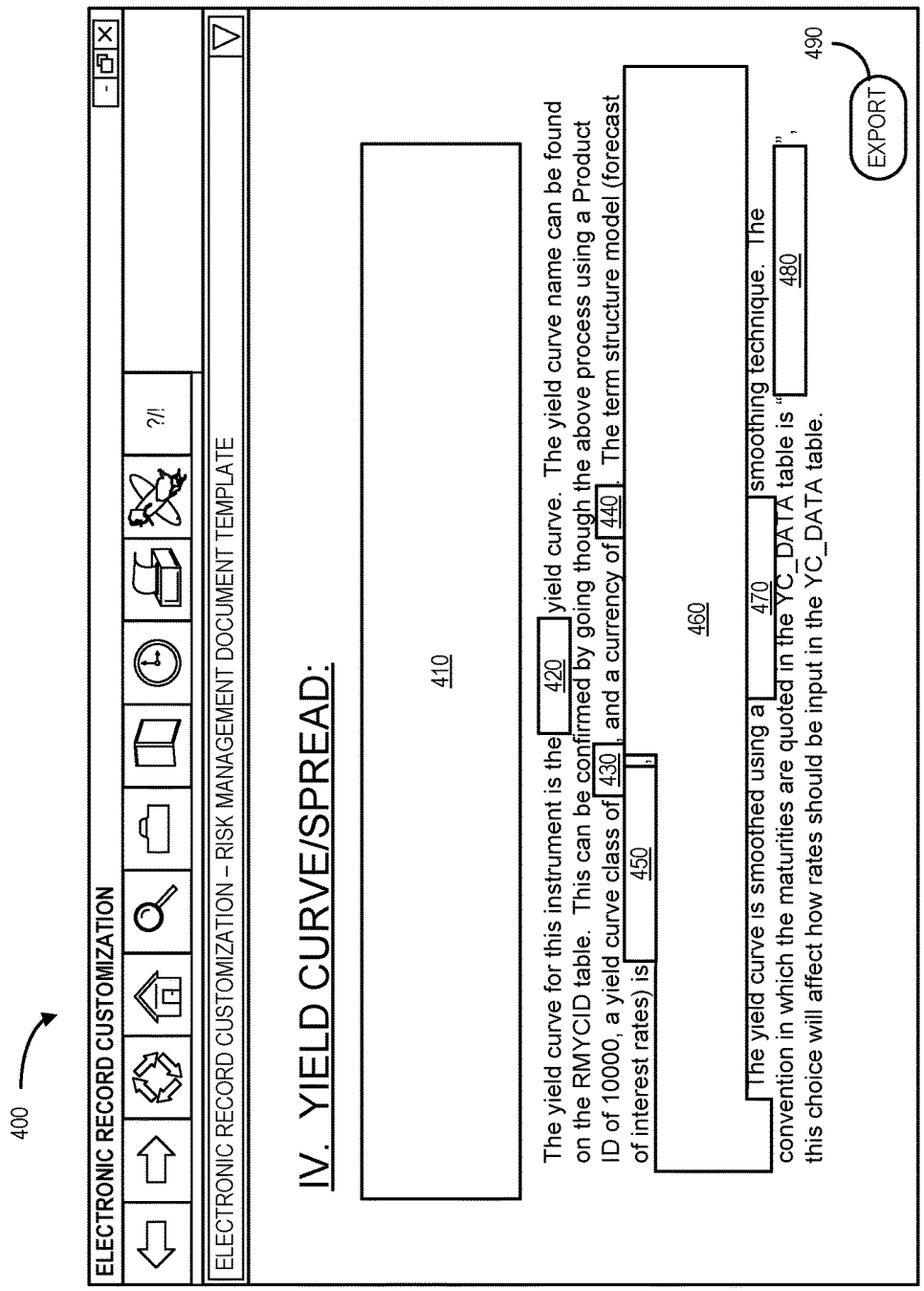
FIG. 4 illustrates an exemplary risk management document template display that might be associated with various embodiments described herein.

FIG. 4 illustrates an exemplary risk management document template display 400 that might be associated with various embodiments described herein. In particular, the display 400 is associated with a yield curve/spread definition/explanation and includes fields 410, 420, 430, 440, 450, 460, 470, 480 that may be completed using information stored in a RDBM system database and/or linked tables. The display 400 also includes an "Export" icon 490 that may be used to initiate an automatic document creation process.

FIG. 5 is a data dictionary table 500 in accordance with some embodiments. In this example, the data dictionary table 500 includes a "Prod_Desc," ""ProductVerbose," and "ProductYield" parameters 510. According to some embodiments, the system may retrieve a yield curve summary 520 from the data dictionary table 500 and insert those alphanumeric characters into the template field 410 described with respect to FIG. 4.

Figure 6:
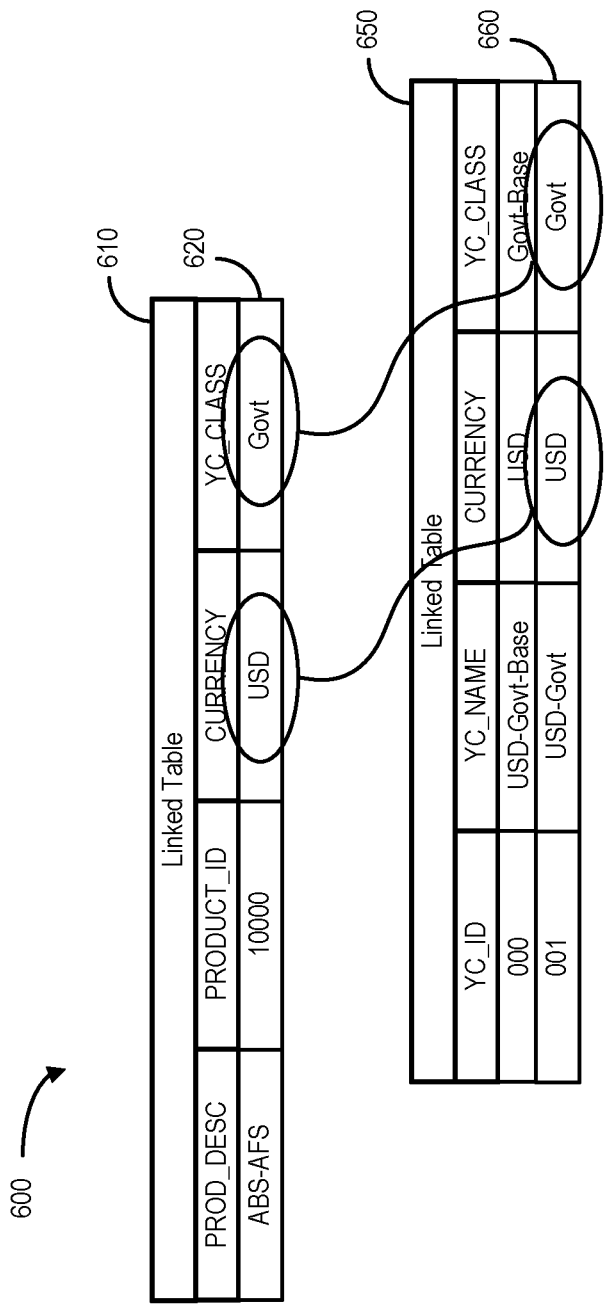
FIG. 6 illustrates yield curve currency and class relationships between linked database tables according to some embodiments of the present invention.

FIG. 6 illustrates yield curve currency and class relationships 600 between linked database tables 610, 650 according to some embodiments of the present invention. In particular, the system may retrieve a yield curve name 620, 660 ("USD-Govt") from a linked risk management table that has the same "YC_CLASS" ("Govt") and "CURRENCY" ("USD" or US Dollars) as the ABS-AFS document being created. This name ("US-Govt") may then be inserted into the template field 420 described with respect to FIG. 4. Similarly, information from the linked database tables 610, 650 may be used to complete fields 430, 440 in the template. Note that in the example of FIG. 6, logic may be associated with a plurality of linked tables 610, 650, including logic that matches multiple pointers (i.e., CURRENCY="USD" and YC_CLASS="Govt") within that single pair of linked tables 610, 650.

Figure 7:
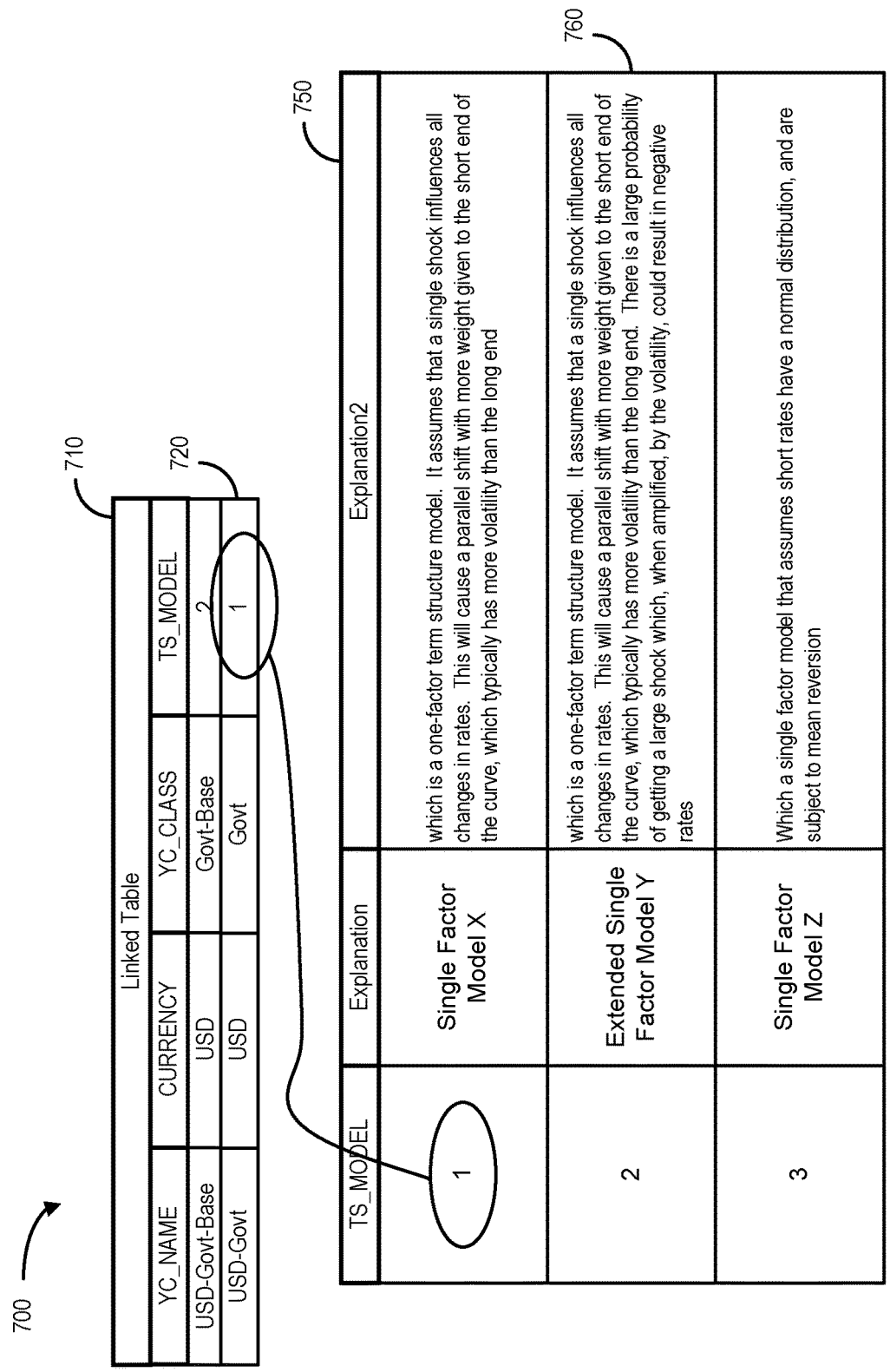
FIG. 7 illustrates a term structure model relationship between linked database tables in accordance with some embodiments.

FIG. 7 illustrates a Term Structure ("TS") model relationship 700 between linked database tables 710, 750 in accordance with some embodiments. In this case, the system may find the term structure explanation 760 from a data dictionary 750 having the same "TS_MODEL" parameter 720 ("1") as the ABS's YC_NAME ("US-Govt"). This explanation 760 may then be inserted into the template fields 450, 460 described with respect to FIG. 4.

Figure 8:
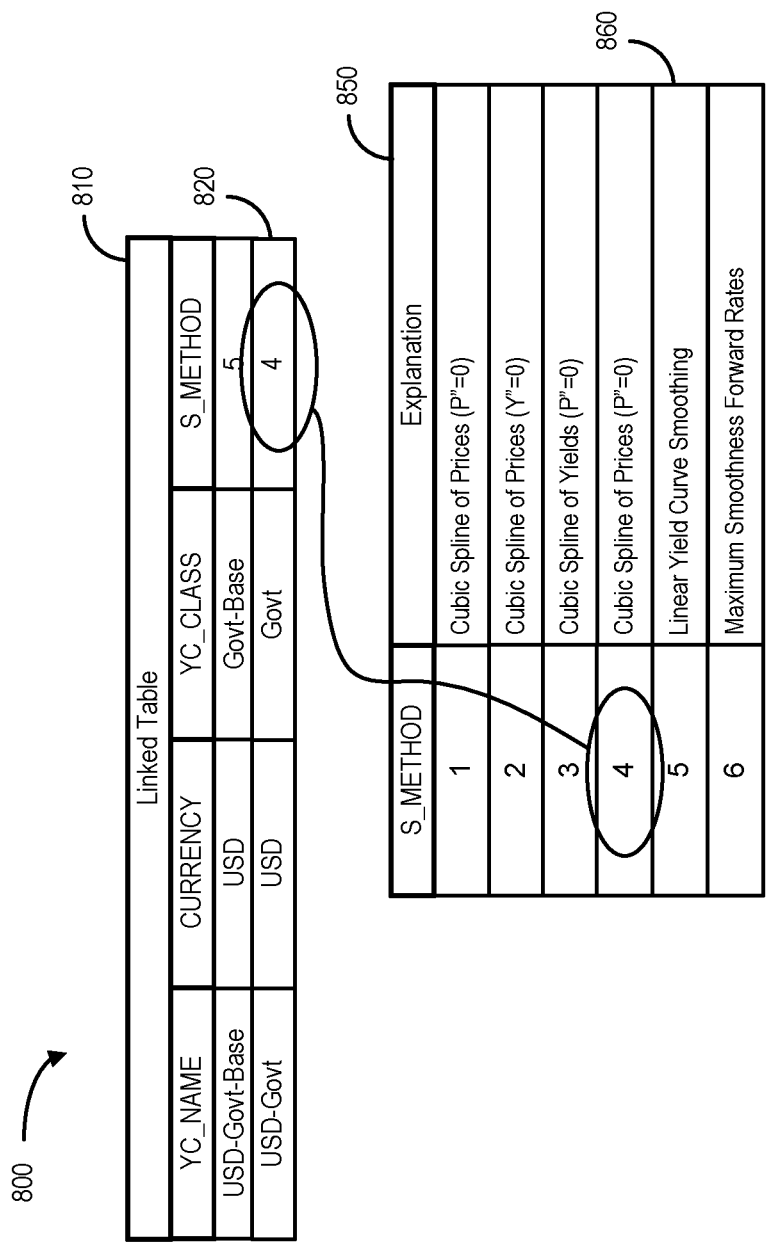
FIG. 8 illustrates a smoothing method relationship between linked database tables in accordance with some embodiments of the present invention.

FIG. 8 illustrates a smoothing method relationship 800 between linked database tables 810, 850 in accordance with some embodiments of the present invention. In this particular example, the system may use the smoothing method parameter ("S_METHOD") 820 ("4") to find a smoothing explanation 860 ("Linear Yield Curve Smoothing") from the data dictionary table 850. This explanation 860 may then be inserted into the template field 470 previously described with respect to FIG. 4.

Figure 9:
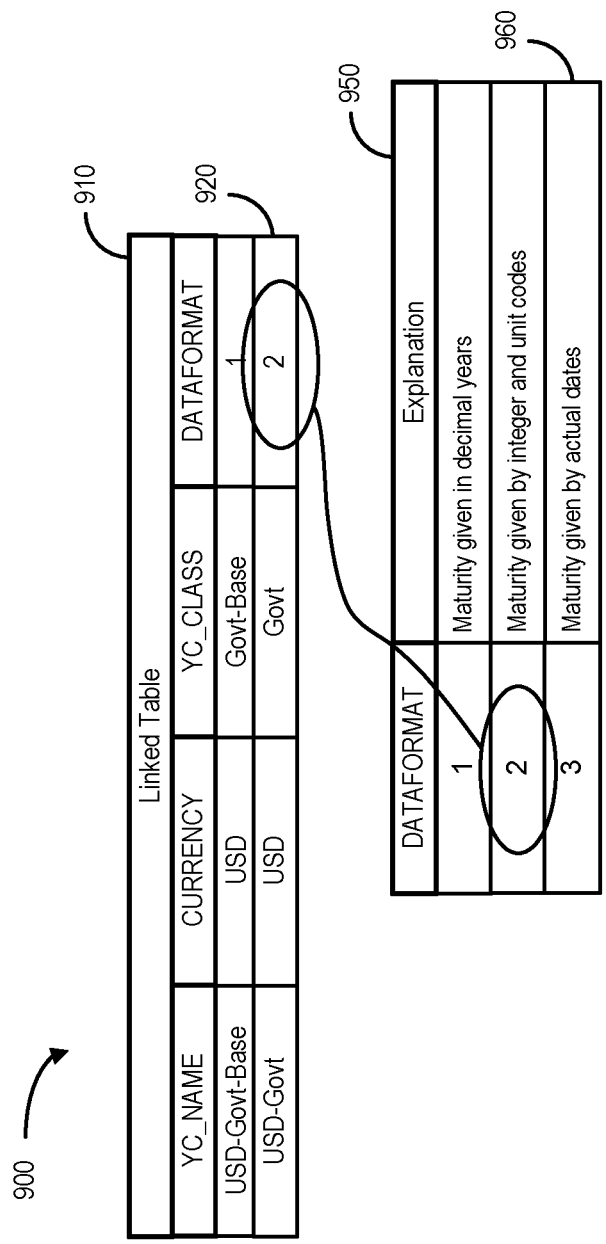
FIG. 9 illustrates a data format relationship between linked database tables according to some embodiments of the present invention.

FIG. 9 illustrates a data format relationship 900 between linked database tables 910, 950 according to some embodiments of the present invention. Here, the system may use the "DATAFORMAT" parameter 920 ("2") to locate a data format explanation 960 ("Maturity given by actual dates") in the data dictionary table 950. This data format explanation 960 may then be inserted into the template field 480 described with respect to FIG. 4.

Figure 10A:
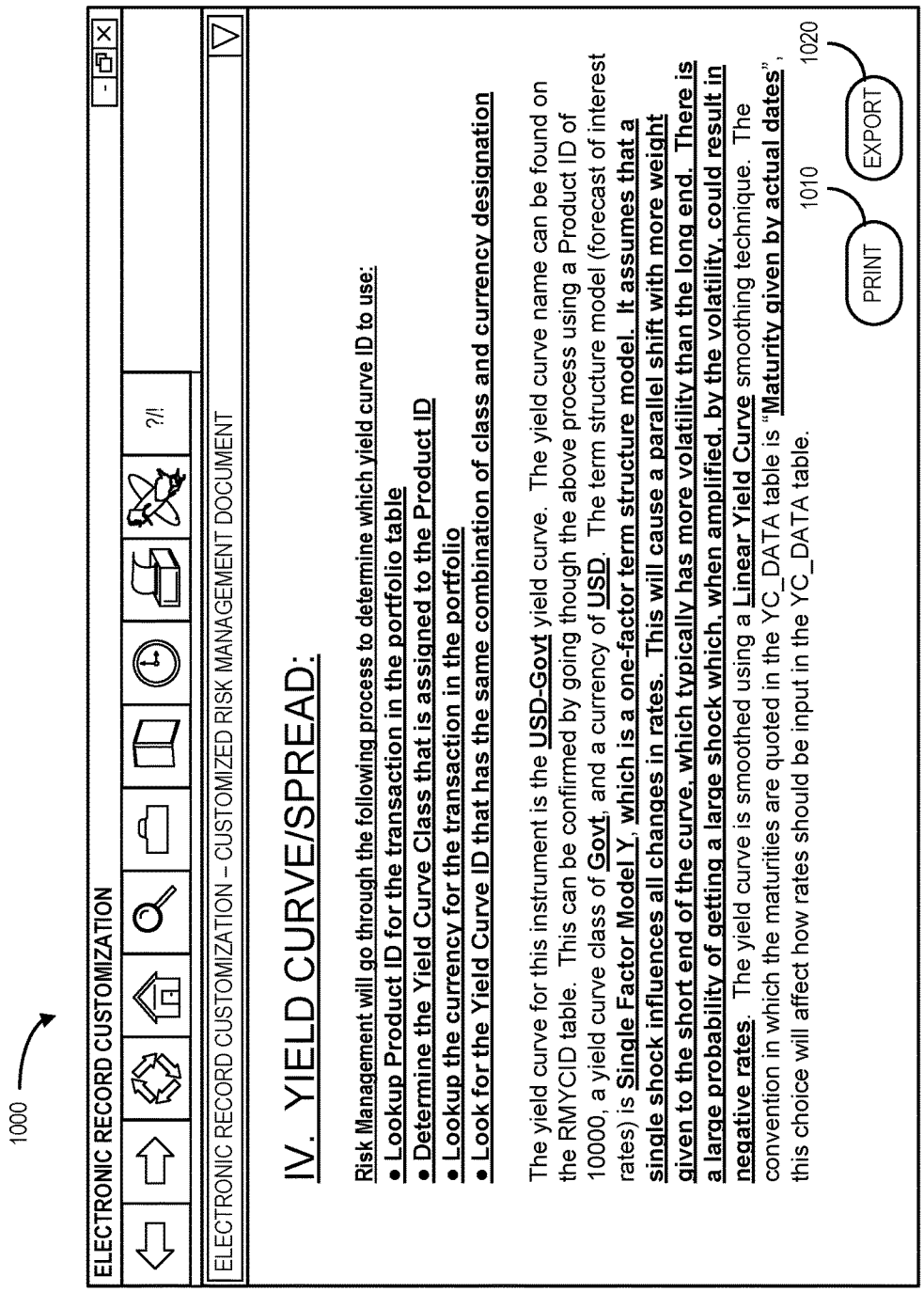
FIG. 10A illustrates an exemplary customized risk management document display that might be associated with various embodiments described herein.

Thus, following the examples of FIGS. 4 through 9 may allow the system to automatically and accurately create a risk management document. For example, FIG. 10A illustrates an exemplary customized risk management document display 1000 that might be associated with various embodiments described herein (e.g., wherein the fields 410, 420, 430, 440, 450, 460, 470, 480 of FIG. 4 have been automatically filled with data as described with respect to FIGS. 5 through 9 as illustrated by bold, underlined text in the display 1000). The display 1000 may further include a "Print" icon 1010 (e.g., to let an operator or administrator create a pdf or paper version of the language included on the display 1000) and an "Export" icon 1020 (e.g., to transmit an electronic version of the record to a remote device or database). Note that the display 1000 illustrated in FIG. 10A might reflect only a portion of a larger customized risk management document. For example, FIG. 10B illustrates a customized risk management document 1050 that is composed of multiple sections 1060, 1070, 1080, 1090 in accordance with some embodiments. Moreover, data in various sections may be similarly formatted and/or interact with other sections of the document 1050.

Figure 11:
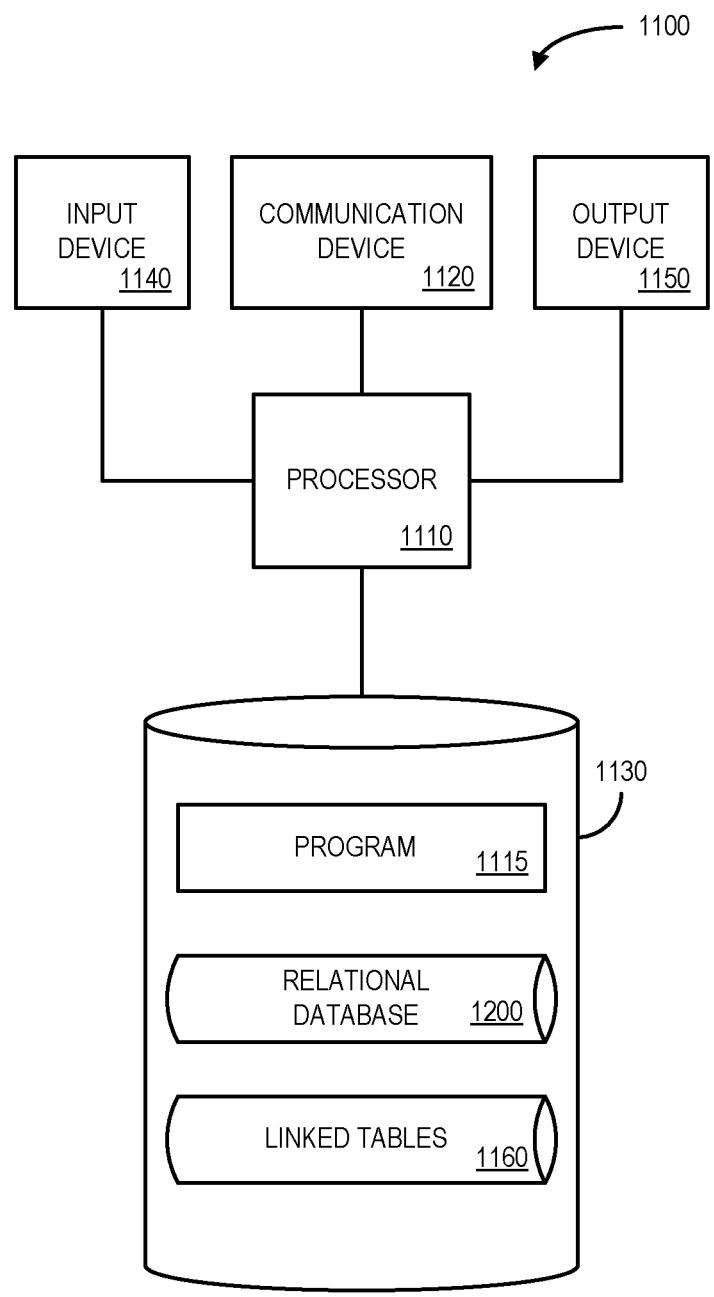
FIG. 11 is a block diagram of an apparatus in accordance with some embodiments of the present invention.

The embodiments described herein may be implemented using any number of different hardware configurations. For example, FIG. 11 illustrates a back-end application computer server 1100 that may be, for example, associated with the system 100 of FIG. 1. The back-end application computer server 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote administrator computers and or communication devices (e.g., PCs and smartphones). Note that communications exchanged via the communication device 1120 may utilize security features, such as those between a public internet user and an internal network of the insurance enterprise. The security features might be associated with, for example, web servers, firewalls, and/or PCI infrastructure. The back-end application computer server 1100 further includes an input device 1140 (e.g., a mouse and/or keyboard to enter information about electronic record content, data dictionary versions and/or parameters, document version control data, etc.) and an output device 1150 (e.g., to output reports regarding system administration and/or automated electronic record creation).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a document creation tool or application for controlling the processor 1110. The processor 1110 performs instructions of the program 1115, and thereby operates in accordance with any of the embodiments described herein. For example, the processor 1110 may access a relational database management system database and a plurality of database tables linked to the relational database management system database. The processor 1110 may also retrieve electronic record layout information and utilize pre-determined mapping logic to automatically insert accessed data into a customized electronic record in accordance with the electronic record layout information. The customized electronic record may then be transmitted by the processor 1110 to be rendered via an interactive user interface display.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the back-end application computer server 1100 from another device; or (ii) a software application or module within the back-end application computer server 1100 from another software application, module, or any other source.

In some embodiments (such as shown in FIG. 11), the storage device 1130 further stores linked tables 1160 (e.g., associated templates, data dictionaries, financial parameters, etc.) and a relational database 1200. An example of a database that might be used in connection with the back-end application computer server 1100 will now be described in detail with respect to FIG. 12. Note that the database described herein is only an example, and additional and/or different information may be stored therein. Moreover, various databases might be split or combined in accordance with any of the embodiments described herein. For example, the linked tables 1160 and/or relational database 1200 might be combined and/or linked to each other within the program 1115.

Figure 12:
FIG. 12 is a portion of a tabular relational database according to some embodiments.

Referring to FIG. 12, a table is shown that represents the relational database 1200 that may be stored at the back-end application computer server 1100 according to some embodiments. The table may include, for example, entries identifying electronic records and/or documents that were automatically created, displayed, printed, and/or transmitted. The table may also define fields 1202, 1204, 1206, 1208, 1210, 1212 for each of the entries. The fields 1202, 1204, 1206, 1208, 1210, 1212 may, according to some embodiments, specify: a document identifier 1202, a document name 1204, a template identifier 1206, a parameter name 1208, a parameter value 1210, and a status 1212. The relational database 1200 may be created and updated, for example, based on information electrically received from one or more linked tables and/or an automatic document creation tool (e.g., executed by an operator or administrator).

The document identifier 1202 may be, for example, a unique alphanumeric code identifying an electronic record that may be (or has been) automatically created by the system, and the document name 1204 may describe the contents of the document, define a format of the document (e.g., a text or pdf file), comprise a pointer to a location where the document is stored, etc. According to some embodiments, a section name or identifier may further be used to describe or define a portion of a document. The template identifier 1206 may be, for example, associated with layout information, business rules and/or logic, linked database table information, algorithms, etc. associated with the template that will be (or has been) used to create the electronic file associated with the document identifier 1202. The parameter name 1208 may be associated with, for example, a financial parameter, and the parameter value 1210 may comprise a specific number or string of text (e.g., a description) that is to be associated with that parameter in connection with the document. The status 1212 might indicate, for example, when the parameter value 1210 was last updated (and/or whether an update of the parameter should trigger a re-creation of the electronic record or document associated with the document identifier 1202).

Thus, embodiments may provide an automated and efficient way to create and/or transmit electronic records such as documents associated with risk management of financial assets. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
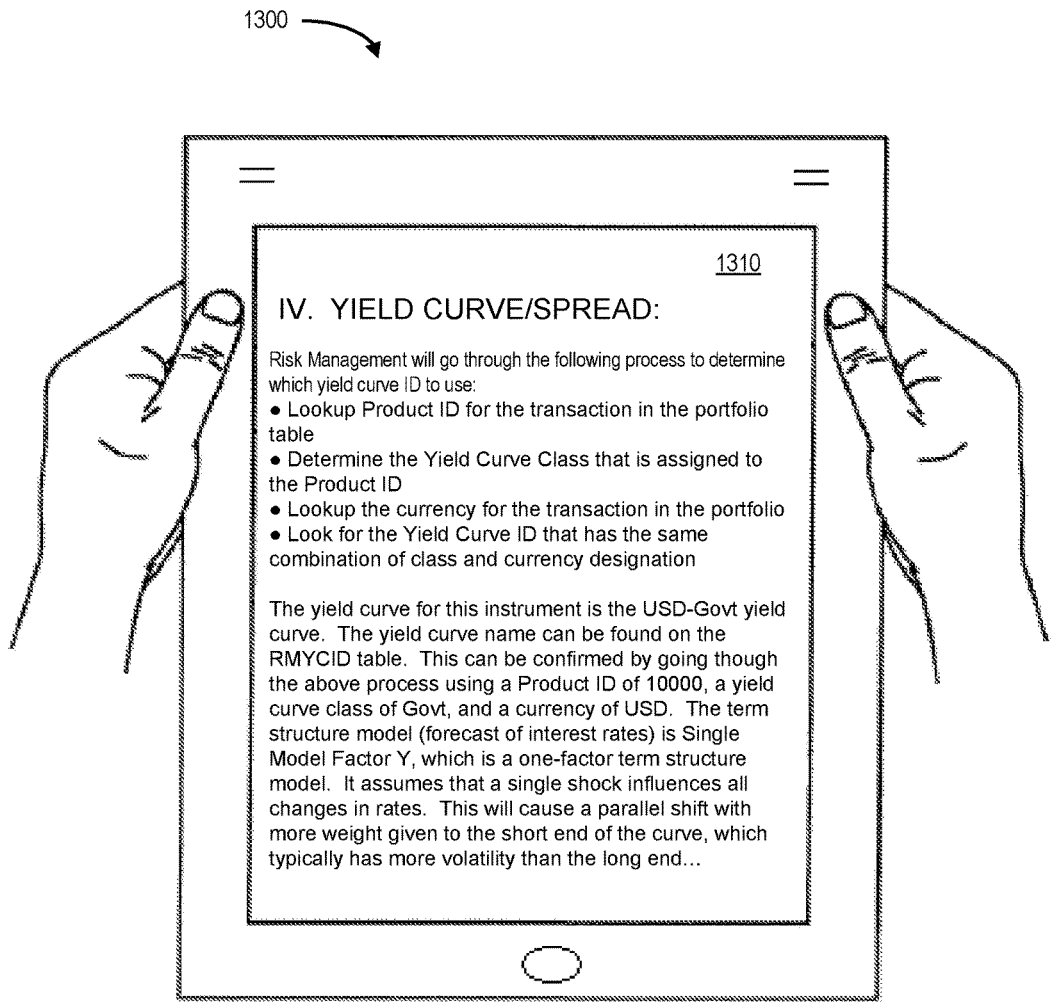
FIG. 13 illustrates a tablet computer displaying multivariate testing program information according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of electronic records (e.g., documents), embodiments may instead be associated with other types of records (e.g., computer files, audio signals, etc.). Still further, the displays and devices illustrated herein are only provided as examples, and embodiments may be associated with any other types of user interfaces. For example, FIG. 13 illustrates a handheld risk management document display 1300 according to some embodiments. The risk management document display 1300 might include automatically created text 1310 and/or graphical icons such that electronic records may be automatically created and/or modified by a user of the handheld computer.

Figure 14:
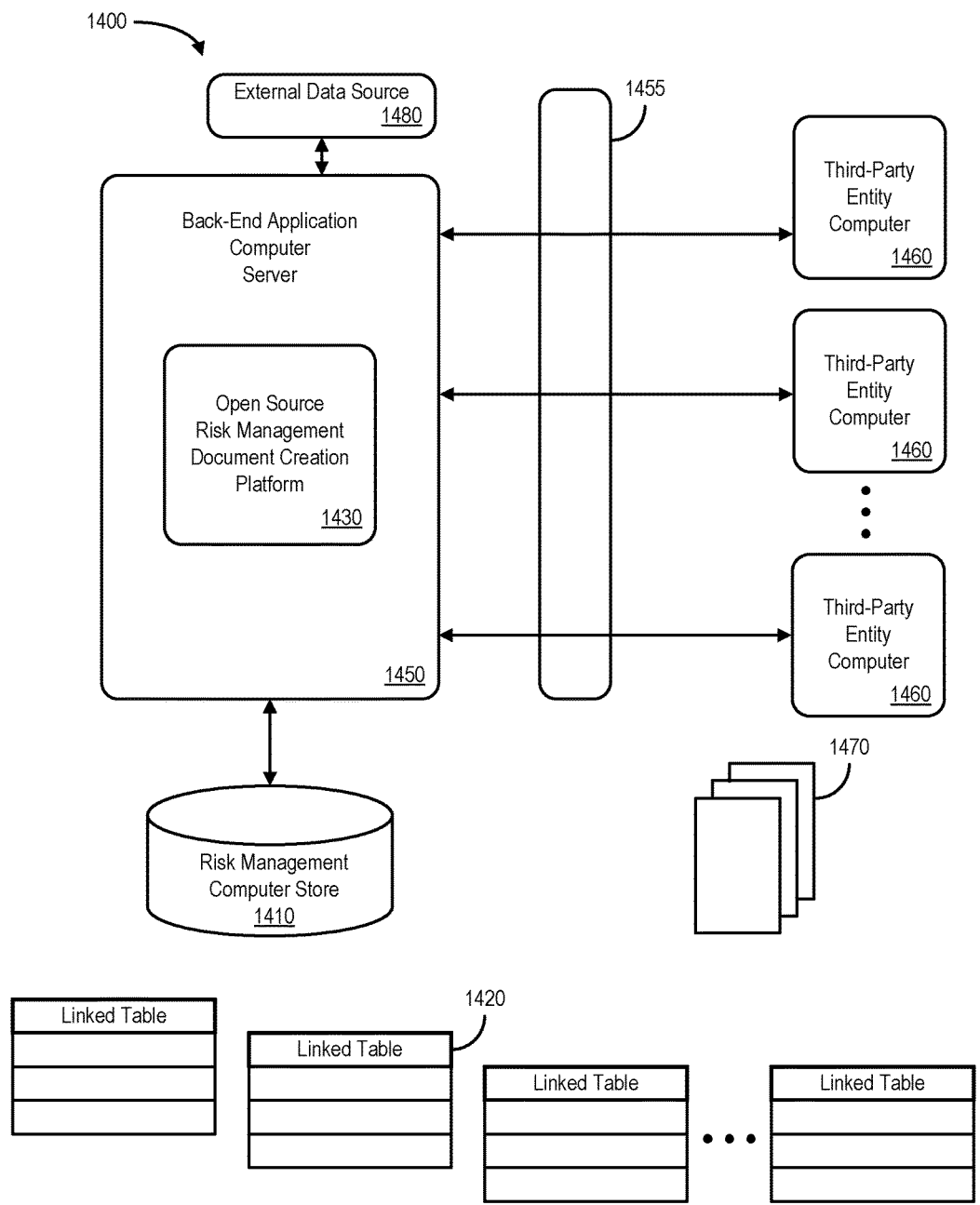
FIG. 14 is a high-level block diagram of an open source system that might be implemented in accordance with some embodiments.

Moreover, although embodiments have been described as being associated with a single enterprise, note that in some embodiments the automated back-end application computer server might be associated with an open source platform accessed by a plurality of third party entities to create customized electronic records. FIG. 14 is a high-level block diagram of an open source system 1400 that might be implemented in accordance with such embodiments. As before, the system 1400 includes a back-end application computer server 1450 that may access information in a risk management computer store 1410 (e.g., storing one or more relational databases, data dictionaries, parameters, pre-determined mapping logic, etc.) and a plurality of linked tables 1420 (e.g., containing data, such as alphanumeric values, images, etc.) that might be automatically incorporated into electronic records or document). The back-end application computer server 1450 may also exchange information with a number of different third-party entity computers 1460 (e.g., via one or more firewalls and data validation processes 1455). According to some embodiments, the back-end application computer server 1450 may also receive information from one or more external data sources 1480 (e.g., a governmental data source, a banking data source, a credit data source, etc.).

According to some embodiments, an open source risk management document creation platform 1430 of the back-end application computer server 1450 may facilitate a creation and/or compilation of electronic documents 1470 and/or the transmission of such documents via one or more of the third-party entity administrator computers 1460. The back-end application computer server 1450 might be, for example, associated with a PC, laptop computer, smartphone, an enterprise server, a server farm, and/or a database or similar storage devices.

As used herein, devices, including those associated with the back-end application computer server 1450 and any other device described herein, may exchange information via any communication network. The back-end application computer server 1450 may store information into and/or retrieve information from the risk management computer store 1410. The computer store 1410 might, for example, store data associated with risk management documents. The computer store 1410 may be locally stored or reside remote from the back-end application computer server 1450. The risk management computer store 1410 may be used by the back-end application computer server 1450 to generate and/or transmit automatically created risk management documents 1470 associated with an asset. Although a single back-end application computer server 1450 is shown in FIG. 14, any number of such devices may be included.

According to some embodiments, the system 1400 may automatically create documents via the automated back-end application computer server 1450. For example, one third-party entity computer 1460 may request that document be created and/or updated. The open source risk management document creation platform 1430 may then access information in the risk management computer store 1410 and/or linked tables 1420, and transmit an electronic file or series of files comprising the appropriate document 1470 to the third-party entity. In this way, multiple enterprises (e.g., banks and/or insurance companies) may share explanations, descriptions, etc. for risk management documents associated with assets.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to customize electronic records associated with a distributed communication network via an automated back-end application computer server, comprising:
   (a) a relational database management system database;
   (b) a data dictionary;
   (c) a template database containing electronic record layout information;
   (d) a data format relationship database;
   (e) a plurality of database tables linked to the relational database management system database;
   (f) a communication port to facilitate access to the relational database management system database and the plurality of database tables via the distributed communication network; and
   (g) the back-end application computer server, coupled to the communication port, programmed to:
      (i) retrieve the electronic record layout information from the template database,
      (ii) access information from the plurality of linked database tables via the relational database management system database,
      (iii) retrieve image data to be inserted into a customized electronic record from a third-party source,
      (iv) execute a data verification process to ensure that the retrieved image data received from the third-party source is all of: (1) complete image data, (2) up-to-date image data, and (3) image data that has not become corrupt,
      (v) utilize pre-determined logic associated with the plurality of linked tables, including logic that requires matching both a first pointer and a second pointer within a single pair of linked tables, to automatically insert accessed data into the customized electronic record in accordance with the electronic record layout information, information in the data dictionary, and information in the data format relationship database, and
      (vi) transmit the customized electronic record to be rendered via an interactive user interface display;
   wherein:
      said inserting is performed upon initiation by an operator, said initiation occurring by the operator executing a document creation tool;
      the customized electronic record comprises a human-readable risk management document associated with an asset;
      the asset is associated with insurance industry assets; and
      the asset is further associated with asset backed securities—available for sale.

2. The system of claim 1, wherein at least one of the relational database management system database and the plurality of database tables are associated with all of: (i) the template, (ii) visual basic for applications code, (iii) structured query language data, (iv) the data dictionary, and (v) financial parameters.

3. The system of claim 1, wherein the automated back-end application computer server is associated with an open source platform accessed by a plurality of third party entities to create customized electronic records.

4. The system of claim 1, wherein the human-readable risk management document is further associated with sections including each of: (i) a valuation, (ii) a yield curve/spread, (iii) a day count description, and (iv) a credit description.

5. A computerized method to customize electronic records associated with a distributed communication network via an automated back-end application computer server, comprising:
 accessing a relational database management system database;
 access a template database containing electronic record layout information;
 accessing a plurality of database tables linked to the relational database management system database;
 retrieving, by the back-end application computer server, the electronic record layout information from the template database;
 retrieving image data to be inserted into a customized electronic record from a third-party source;
 executing a data verification process to ensure that the retrieved image data received from the third-party source is all of: (1) complete image data, (2) up-to-date image data, and (3) image data that has not become corrupted;
 utilizing pre-determined logic associated with the plurality of linked tables, including logic that requires matching both a first pointer and a second pointer within a single pair of linked tables, to automatically insert accessed data into the customized electronic record in accordance with the electronic record layout information, information in a data dictionary, and information in a data format relationship database; and
 transmitting the customized electronic record to be rendered via an interactive user interface display;
 wherein:
  said inserting is performed upon initiation by an operator, said initiation occurring by the operator executing a document creation tool;
  the customized electronic record comprises a human-readable risk management document associated with an asset;
  the asset is associated with insurance industry assets; and
  the asset is further associated with asset backed securities—available for sale.

6. The method of claim 5, wherein at least one of the relational database management system database and the plurality of database tables are associated with all of: (i) the template, (ii) visual basic for applications code, (iii) structured query language data, (iv) the data dictionary, and (v) financial parameters.

7. The method of claim 5, wherein the automated back-end application computer server is associated with an open source platform accessed by a plurality of third party entities to create customized electronic records.

8. A non-transitory, computer-readable medium storing instructions, that, when executed by a processor, cause the processor to perform a method to customize electronic records associated with a distributed communication network via an automated back-end application computer server, the method comprising:
 accessing a relational database management system database;
 accessing a template database containing electronic record layout information;
 accessing a plurality of database tables linked to the relational database management system database;
 retrieving, by the back-end application computer server, the electronic record layout information from the template database;
 retrieving image data to be inserted into a customized electronic record from a third-party source;
 executing a data verification process to ensure that the retrieved image data received from the third-party source is all of: (1) complete image data, (2) up-to-date image data, and (3) image data that has not become corrupted;
 utilizing pre-determined logic associated with the plurality of linked tables, including logic that that requires matching both a first pointer and a second pointer within a single pair of linked tables, to automatically insert accessed data into the customized electronic record in accordance with the electronic record layout information, information in a data dictionary, and information in a data format relationship database; and
 transmitting the customized electronic record to be rendered via an interactive user interface display;
 wherein:
  said inserting is performed upon initiation by an operator, said initiation occurring by the operator executing a document creation tool;
  the customized electronic record comprises a human-readable risk management document associated with an asset;
  the asset is associated with insurance industry assets; and
  the asset is further associated with asset backed securities—available for sale.

9. The medium of claim 8, wherein at least one of the relational database management system database and the plurality of database tables are associated with-all of: (i) the template, (ii) visual basic for applications code, (iii) structured query language data, (iv) the data dictionary, and (v) financial parameters.

10. The medium of claim 8, wherein the automated back-end application computer server is associated with an open source platform accessed by a plurality of third party entities to create customized electronic records.

* * * * *